March 17, 1970  E. CULPEPPER  3,500,497
BLOW MOLDING APPARATUS WITH COOLING MEANS
Filed Jan. 2, 1968

INVENTOR.
EUGENE CULPEPPER
BY
*Young + Zuigg*
ATTORNEYS

United States Patent Office 3,500,497
Patented Mar. 17, 1970

3,500,497
BLOW MOLDING APPARATUS WITH COOLING MEANS
Eugene Culpepper, Newnan, Ga., assignor to Phillips Petroleum Company, a corporation of Delaware
Filed Jan. 2, 1968, Ser. No. 695,047
Int. Cl. B29c 5/06
U.S. Cl. 18—5                                    5 Claims

ABSTRACT OF THE DISCLOSURE

Apparatus for blow molding articles comprises an air injection needle extending into the interior of the mold cavity there being disposed within said needle a plurality of cooling fluid injection conduits the extremities of which do not extend beyond the axial or circumferential extremities of said needle and being at an angle of up to 120° with the axis of said conduit.

BACKGROUND OF THE INVENTION

Figure 1:
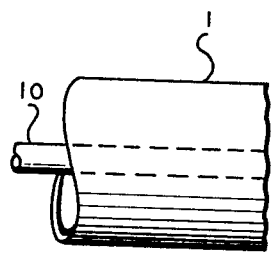

The process of forming articles, particularly blown articles, from thermoplastic materials comprises first bringing the thermoplastic material into a plastic or moldable condition. A thermoplastic material is one that is hard at normal or room temperature and rendered plastic and moldable under elevated temperatures and pressures. Examples of some thermoplastic materials are: polyethylene, polypropylene and copolymers thereof, other 1-polyolefins, polystyrene, and polyvinyl chloride, and the like. Thermoplastic materials used for forming articles are brought to a plastic or moldable condition in two basic ways. In the first way, the material in a comminuted form is subjected simultaneously to heat and pressure and admixing. In the present instance, the means shown for accomplishing this purpose is not part of the present invention, but can be any plasticizing means, such as an extruder or injection molding machine, having a parison extrusion die directly communicating therewith. The second way is used only when molding a preformed parison that has been initially formed to yield a desirable shape and then subsequently cooled and stored. The preformed parison is then heated in an oven immediately before insertion into the molding device.

A commercially useful process to which the instant invention is applicable comprises rendering the plastic material molten by an injection molding machine. Such plastication is obtained by forcing the plastic material by a ram through a heated cylinder having a torpedo inserted therein. The molten material is then fed from the injection nozzle to the parison extrusion die and the parison (tubular form) is extruded from said die by the force exerted by said ram. When an extruder is used as the plasticating means, the force supplied by the extruder's auger or screw is utilized to extrude the parison from the die. When using an extruder, the continuous operation of same is maintained by use of at least two parison dies being fed alternately from the extruder. A frequently used method utilizes an extruder feeding molten plastic material to a reservoir chamber, wherein a piston intermittently forces material therefrom to a parison extrusion die.

The parison is extruded downward from the die, the mold closes around the parison, sealing together the upper and lower ends of the parison by clamping same together. The parison is expanded by positive pressure to the shape of the mold. After the article has taken shape and the mold is opened, the article is then severed from the parent material at the die. Before the thermoplastic article can be removed from the mold, it must be cooled and hardened so that it will not be damaged during the removal process. One method of cooling and thereby hardening a formed thermoplastic article is by utilizing a cooled mold such as one having a cooling fluid flowing through passages in the mold sections. Such a method has been found to be slower than is desirable owing to the considerable length of time required for cooling the molten plastic. Another method employs a cooling liquid which is circulated within the blown or expanded article by which it is quickly chilled and hardened, thus permitting the mold to be opened and the blown article to be removed without cooling the entire mold. However, problems occur using this method because the cooling liquid upon coming into contact with the hot formed thermoplastic material will cause the inside surfaces to cool more rapidly than the outside surfaces. This will result in the formation of blisters or stressed and warped areas due to the non-uniform contraction of the material during the cooling operation.

These imperfections as well as numerous others which result from the uneven distribution of cooling fluid throughout the molded article can be substantially minimized and even eliminated by the process and apparatus of this invention.

It is therefore one object of this invention to provide an improved method and apparatus for blow molding. It is another object of this invention to provide improved apparatus for distributing cooling fluid throughout the interior of molded articles. It is another object of this invention to provide improved apparatus for uniformly cooling the surfaces of blow molded articles within the mold.

In accordance with one embodiment of this invention cooling fluid is injected into the interior of the mold cavity and formed article through a plurality of conduits extending into the mold cavity through an air blow needle, the extremities of the conduits being oriented at an angle of up to 120° with the axis of the needle and not extending beyond the axial or circumferential extremities of the air blow needle.

According to one aspect of this invention, air from 40 to 70° F. is first introduced into the interior of a heated tube or against one side of a heated substrate or heated preformed parison of thermoplastic material clamped in a mold cavity to expand said tube, substrate, or preformed parison to conform to the shape of the inner walls of said mold that are in contact with said expanded tube, substrate or preformed parison. When the said thermoplastic material is thus formed, liquid carbon dioxide or a mixture of air and carbon dioxide is passed through the mold cavity to cool and thereby harden the said thermoplastic material. The temperature of the air-$CO_2$ mixture will be maintained from about —25 to 15° F. depending on the type of and thickness of the thermoplastic material to be cooled. The air-$CO_2$ mixture is easily obtained by evaporating liquid carbon dioxide in a heat exchange zone wherein the said liquid $CO_2$ is contacted with warm air. This process cools the air and warms the $CO_2$ to form a cool gaseous mixture. The temperature of the gaseous mixture can be adjusted by varying the relative amounts of air and liquid $CO_2$ introduced into the heat exchange zone. This method of cooling the formed thermoplastic material will prevent the blistered and warped areas that can occur when an extremely cold liquid such as liquid $CO_2$ is utilized to directly cool the formed article. This method also prevents freeze-ups in the cooling line from the cooling liquid source to the mold that occur when an extremely cold liquid, such as liquid $CO_2$, comes in contact with any water-vapor that is collected in the said line.

Most liquefied gases can be used in this invention. For example, liquefied petroleum gases or nitrogen can be used. However, the explosive nature of liquefied petroleum gas would render it undesirable. Liquid $CO_2$ is preferred because of its availability and its unique physical characteristics and chemical inertness.

Several of the advantages of this invention are that cooling fluid is more evenly distributed throughout the interior of the molded article whereby the several sections of the article are more uniformly cooled with the result that deformation in the side walls are substantially minimized or eliminated due to the elimination of differential cooling rate. Where the side wall of the article in the area penetrated by the air blow needle is to be retained as a part of the finished article, it is, of course, desirable that the needle be as small as possible to accomplish the function of rapidly admitting pressurized fluid into the interior of a semi-fluid preform in order that disfiguration of the side wall is not extensive. Similarly, it is desirable to situate the cooling fluid conduits within the air blow needle so that the extremities of the conduits do not extend beyond the axial or the circumferential, e.g., lateral extremities of the needle whereby snagging of the preform and/or article side wall during injection of the needle is prevented.

Obviously due to the sequential nature of the molding operation herein described, it is possible to fixedly mount the cooling fluid conduits within the air blow needle so that the combination penetrates the side wall of the preform in a single step. However, if desired, the cooling fluid conduits can be reciprocally mounted within the interior of the air blow needle whereby the periphery of the needle pierces the side wall of the preform with provision for the subsequent axial extension of the cooling fluid conduits within the needle after or during the forming cycle to provide the desired orientation of the cooling fluid conduits during the subsequent cooling step.

Figure 3:
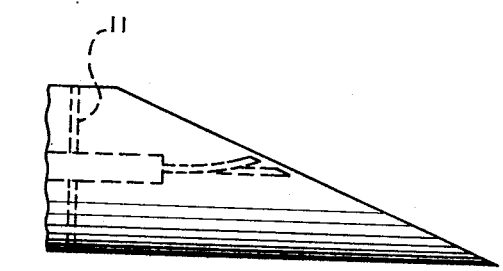
Figure 3:
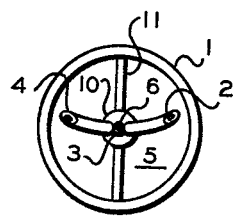
Figure 2:
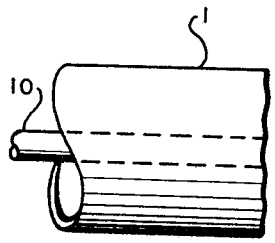
Figure 2:
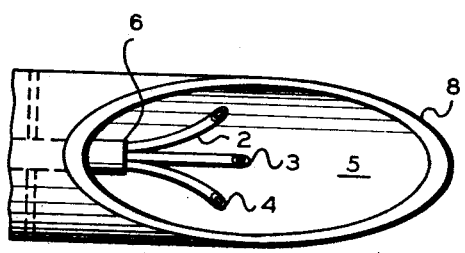
Figure 4:
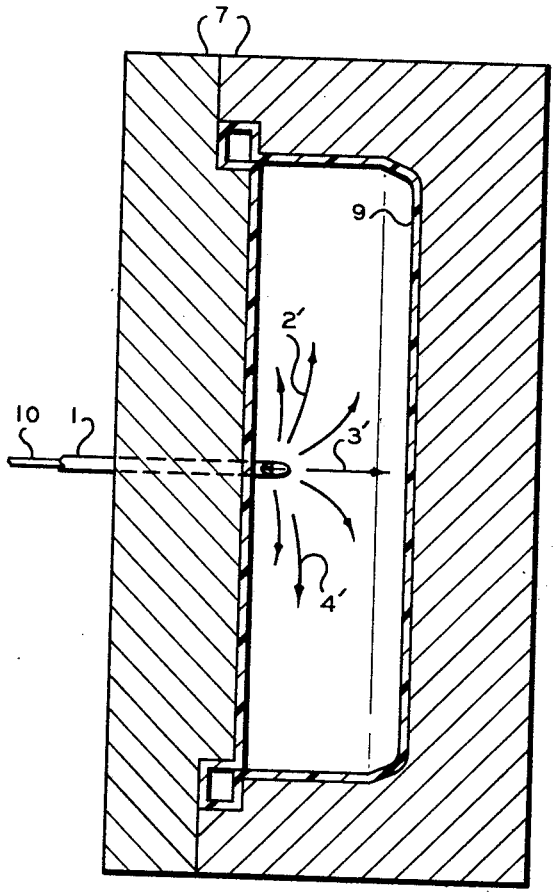

The several aspects and advantages of this invention can be better understood by the reference to the drawings of which FIGURE 1 is a side planar view of an air injection needle having three cooling fluid conduits disposed therein, FIGURE 2 is a top view of the apparatus of FIGURE 1, FIGURE 3 is an end view of the apparatus of FIGURE 1 and FIGURE 4 is a sectional view of the combination of the apparatus of FIGURE 1 with a blow mold.

Referring now to FIGURES 1 and 2, pointed air injection needle 1 having opening 8 is provided with cooling fluid conduits 2, 3, and 4 extending through the interior of the needle from feeder line 10. Feeder line 10 is fixedly positioned by support 11 or by any other suitable means. Although it is not necessary it is convenient to provide that the operating end of injection needle 1 be pointed to facilitate entrance of the needle into the side wall of the softened preform. As a result it is preferred that the open face of the needle 8 be defined by a plane intersecting the axis of the needle at an angle of from about 90 to about 30°. During the forming cycle, pressurized fluid is injected into the interior of the preform through annular space 5 in needle 1. After the formation of the article the injection of pressurized fluid through this annular space is discontinued at which time cooling fluid is injected through the several conduits 2, 3, and 4 in the interior of the needle. As illustrated in FIGURES 1, 2, and 3 there are provided three cooling fluid conduits of which the extremities are oriented with respect to the axis of fluid injection needle 1 so that cooling fluid entering the interior of the formed article through each of the needles 2, 3, and 4 is distributed in a different direction. The orientation of each conduit or of the set of conduits is generally determined by the interior configuration of the formed article and the position at which the needle is injected into the side wall of the article. As a result depending on the configuration of the article or the desired rate of cooling of the several surfaces of the formed article, the orientation of each conduit can be varied considerably. Obviously, numerous such conduits can be provided with the further provision that the cooling fluid injection system can comprise a plurality of conduits of varying cross-sectional area so that less fluid emanates from the smaller conduits than from larger conduits with a similar relative differential in fluid velocity.

It is presently preferred that the cooling fluid conduits be constructed of a relatively flexible metallic tubing such as aluminum, copper, etc., to facilitate modification of the cooling fluid distribution as desired. In addition, it is also preferable to solder these several conduits together at the end 6 of feeder line 10 in FIGURES 1 to 2 to stabilize the positioning of the conduits.

Several of the advantages to be derived from the content of this invention are illustrated in FIGURE 4. Following the termination of the forming cycle the preform has been conformed to the interior of the mold cavity defined by mold halves 7 to produce an article of desired configuration 9. Injection of pressurized fluid is then discontinued, at which time cooling fluid is injected into conduits 2, 3 and 4 which provide the distribution of cooling fluid as illustrated by the sets of arrows designated 2', 3', and 4', respectively. If, during the course of the production of several articles, it is determined that the distribution of cooling fluid is unsatisfactory for the production of articles free from imperfections attributable to differential cooling rates, the orientation of the several cooling fluid conduits can be modified to effect more uniform distribution of cooling fluid.

I claim:
1. In an apparatus for blow molding articles of heat softenable material wherein a preform of said material in softened form is conformed to the interior surface of the mold by injecting pressurized fluid into said preform through a tubular injection needle extending into the interior of said mold cavity and the interior of said preform and being in intermittent communication with a source of pressurized fluid outside said mold cavity, the improvement comprising a plurality of tubular conduits disposed within said needle in communication with the interior of said mold and in intermittent communication with a source of a second fluid, the axial extension of said needle within said mold being at least equal to the extension of said conduits along the axis of said needle, the lateral extension of the extremities of said conduits being not greater than the lateral extent of the side walls of said needle.

2. The apparatus of claim 1 wherein the extremities of said conduits are positioned at an angle of within 120° of the axis of said needle and within an angle defined by the outlet of each respective conduit and the extremities of said needle side walls.

3. The apparatus of claim 2 wherein the extremities of said conduits terminate within the circumference of said needle.

4. The apparatus of claim 2 wherein said extremities of each of said conduits are positioned at different angles to the axis of said needle.

5. The apparatus of claim 2 wherein the axial extremity of said needle is defined by a plane having angle of from 90 to about 30° with respect to the axis of said needle.

References Cited

UNITED STATES PATENTS

| | | | |
|---|---|---|---|
| 1,978,721 | 10/1934 | Perkins | 239—521 X |
| 3,089,185 | 5/1963 | Settem Brini | 18—5 X |
| 3,127,458 | 3/1964 | Scott et al. | 18—5 X |
| 3,237,870 | 3/1966 | McCartney et al. | 239—521 X |
| 3,327,035 | 6/1967 | Parfrey. | |

J. SPENCER OVERHOLSER, Primary Examiner

M. O. SUTTON, Assistant Examiner

U.S. Cl. X.R.

239—422, 521